(12) United States Patent
Christel et al.

(10) Patent No.: US 11,566,104 B2
(45) Date of Patent: *Jan. 31, 2023

(54) PROCESS AND APPARATUS FOR DIRECT CRYSTALLIZATION OF POLYCONDENSATES

(71) Applicant: POLYMETRIX AG, Oberbüren (CH)

(72) Inventors: Andreas Christel, Zuzwil (CH); Brent Allan Culbert, Wil (CH)

(73) Assignee: POLYMETRIX AG, Oberbüren (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,076

(22) Filed: Jun. 23, 2020

(65) Prior Publication Data

US 2020/0347182 A1    Nov. 5, 2020

Related U.S. Application Data

(60) Division of application No. 15/435,817, filed on Feb. 17, 2017, now Pat. No. 10,745,517, which is a
(Continued)

(30) Foreign Application Priority Data

Sep. 26, 2012   (EP) ..................... 12186020

(51) Int. Cl.
 *B29C 71/00*   (2006.01)
 *C08G 63/88*   (2006.01)
 (Continued)

(52) U.S. Cl.
 CPC .............. *C08G 63/88* (2013.01); *B01J 2/06* (2013.01); *B29B 9/065* (2013.01); *B29B 9/16* (2013.01);
 (Continued)

(58) Field of Classification Search
 CPC ........ C08G 63/88; C08G 2250/00; B01J 2/06; B29B 9/065; B29B 9/16; B29B 9/12;
 (Continued)

(56) References Cited

U.S. PATENT DOCUMENTS 3,544,525 A    12/1970   Balint et al.
4,097,212 A *   6/1978   Morishima ............. B29B 9/065
                                                          425/313
(Continued)

FOREIGN PATENT DOCUMENTS

CN    101230130 A    7/2008
CN    101605643 A    12/2009
(Continued)

OTHER PUBLICATIONS

Chinese Office Action corresponding to CN Application No. 201310450617.9 dated Dec. 2, 2016.
(Continued)

*Primary Examiner* — Ryan M Ochylski
(74) *Attorney, Agent, or Firm* — Finch & Maloney PLLC

(57) ABSTRACT

The present invention relates to a process for continuous production of partly crystalline polycondensate pellet material, comprising the steps of forming a polycondensate melt into pellet material; separating the liquid cooling medium from the pellet material in a first treatment space, wherein the pellets after exit from the first treatment space exhibit a temperature $T_{GR}$, and crystallizing the pellet material in a second treatment space, wherein in the second treatment space fluidized bed conditions exist, and in the second treatment space the pellets are heated by supply of energy from the exterior by means of a process gas.

2 Claims, 1 Drawing Sheet

Related U.S. Application Data continuation-in-part of application No. 14/032,357, filed on Sep. 20, 2013, now Pat. No. 9,943,817.

(51) Int. Cl.

| | |
|---|---|
| *B29B 9/06* | (2006.01) |
| *B29B 9/16* | (2006.01) |
| *F26B 17/00* | (2006.01) |
| *B01J 2/06* | (2006.01) |
| *C08J 3/12* | (2006.01) |
| *B29K 67/00* | (2006.01) |
| *B29B 9/12* | (2006.01) |

(52) U.S. Cl.
CPC ............ *B29C 71/0063* (2013.01); *C08J 3/12* (2013.01); *F26B 17/00* (2013.01); *B29B 9/12* (2013.01); *B29B 2009/165* (2013.01); *B29B 2009/168* (2013.01); *B29K 2067/003* (2013.01); *B29K 2995/0041* (2013.01); *C08G 2250/00* (2013.01); *C08J 2367/02* (2013.01); *C08J 2377/00* (2013.01)

(58) Field of Classification Search
CPC ........ B29B 2009/165; B29B 2009/168; B29C 71/0063; C08J 3/12; C08J 2367/02; C08J 2377/00; F26B 17/00; B29K 2067/003; B29K 2995/0041
See application file for complete search history.

(56) References Cited

U.S. PATENT DOCUMENTS

| | | | |
|---|---|---|---|
| 5,041,251 A | 8/1991 | McCoskey et al. | |
| 5,750,644 A | 5/1998 | Duh | |
| 7,084,235 B2 | 8/2006 | Otto et al. | |
| 7,446,162 B2 | 11/2008 | DeBruin | |
| 7,521,522 B2 | 4/2009 | Otto et al. | |
| 8,470,220 B2 | 6/2013 | Hanimann et al. | |
| 8,562,882 B2 | 10/2013 | Eusebio et al. | |
| 9,039,948 B2 | 5/2015 | Glöckner et al. | |
| 2007/0276120 A1 | 11/2007 | DeBruin et al. | |
| 2009/0218052 A1 | 9/2009 | DeBruin et al. | |
| 2010/0038806 A1 | 2/2010 | Eusebio et al. | |

FOREIGN PATENT DOCUMENTS

| | | |
|---|---|---|
| CN | 201925530 U | 8/2011 |
| CN | 102492129 A | 6/2021 |
| DE | 1 905 677 | 10/1969 |
| DE | 10 2004 015 515 A1 | 9/2004 |
| DE | 103 49 016 A1 | 6/2005 |
| DE | 10 2006 058 642 A1 | 6/2008 |
| EP | 0 541 674 B1 | 9/1994 |
| EP | 0 864 409 A2 | 9/1998 |
| WO | 2005/092949 A1 | 10/2005 |
| WO | 2006/060930 A1 | 6/2006 |
| WO | 2007/022994 A1 | 3/2007 |
| WO | 2008/071023 A1 | 6/2008 |
| WO | 2008/071278 A1 | 6/2008 |

OTHER PUBLICATIONS

Scheirs/Long (eds.), Modern Polyesters: Chemistry and Technology of Polyesters and Copolyesters, Wiley Series in Polymer Science, 2003, pp. 31-115 and 143-194, John Wiley & sons Ltd., West Sussex, England See Spec., pp. 1 & 2.

Chinese Office Action dated Oct. 28, 2021.

\* cited by examiner

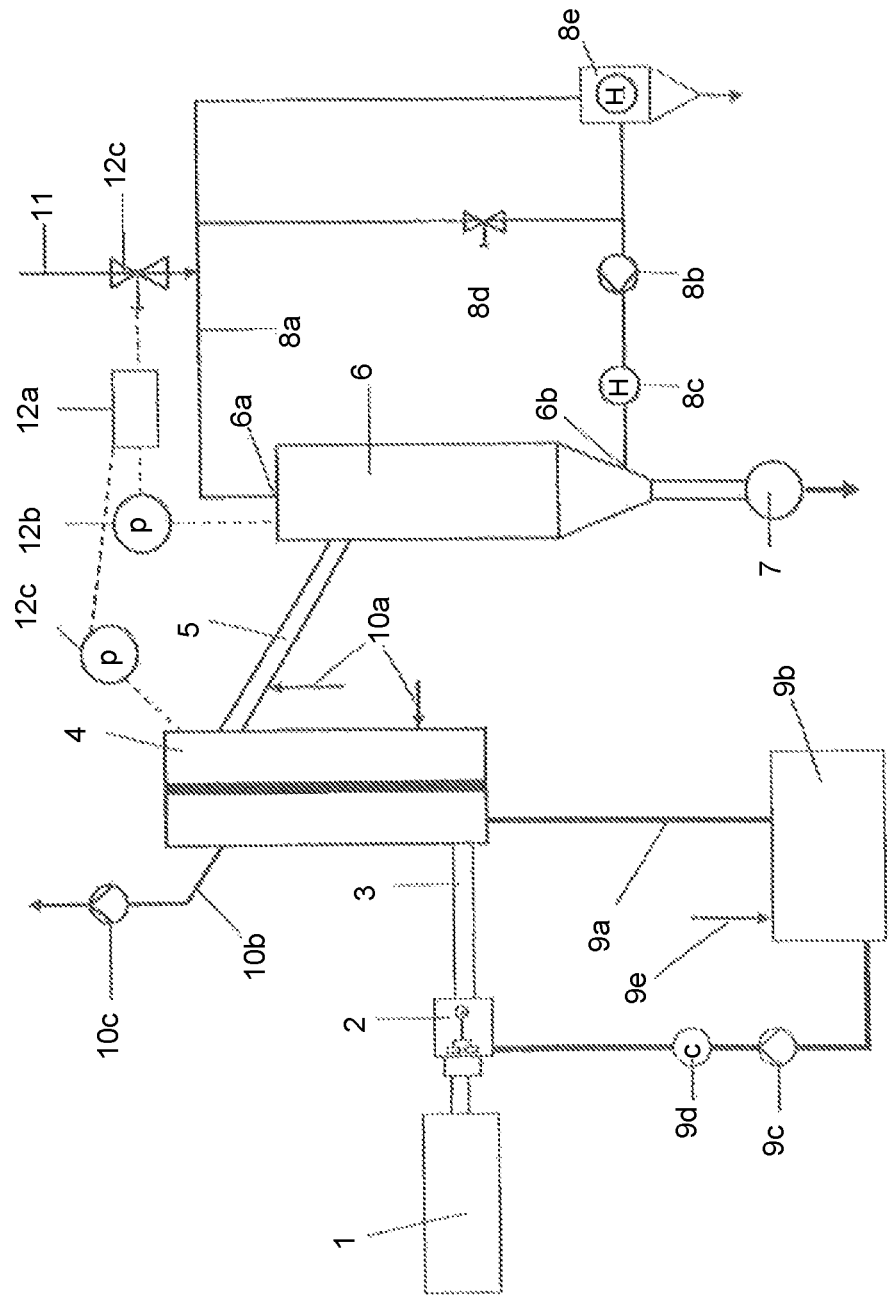

PROCESS AND APPARATUS FOR DIRECT CRYSTALLIZATION OF POLYCONDENSATES

This application is a Divisional of U.S. patent Ser. No. 15/435,817 filed Feb. 17, 2017, which is a Continuation-in-Part of U.S. patent application Ser. No. 14/032,357 filed Sep. 20, 2013, which claims priority from European patent application serial no. 12186020.9 filed Sep. 26, 2012.

The present invention relates to a process and apparatus for direct crystallization of polycondensates, especially polyesters such as polyethylene terephthalate (PET).

The production of certain high molecular weight polymers, especially polycondensates such as polyesters, is frequently not possible via melt polycondensation, since the excessive thermal stress associated therewith is responsible for product degradation and an unacceptable contamination with by-products. Therefore, prepolymers having a comparatively low molecular weight are produced via melt polycondensation. The prepolymers are subsequently raised to the desired molecular weight in a solid-state polymerization (SSP). This procedure is known from the prior art (e.g., Scheirs/Long (eds.), Modern Polyesters, Wiley 2003, chapter 4, pp. 143 ff.).

The prepolymer obtained by melt polycondensation is processed into a pellet material for the SSP reaction. To avoid agglomeration of the pellets under the conditions of the SSP reaction due to stickiness, the pellet material is partly crystallized prior to the SSP reaction. This is also known from the prior art (e.g., Scheirs/Long (eds.), Modern Polyesters, Wiley 2003, chapter 4, pp. 158-164).

If the high-molecular polycondensate can be manufactured by melt polymerization, a subsequent partial crystallization may still be necessary, in order to enable further processing steps, such as devolatilization.

Usually, the polycondensate or polycondensate-prepolymer is cooled down after it has been formed into pellets and reheated for the crystallization. However, processes are also known from the prior art wherein the as-formed pellet material is fed in the hot state to the crystallization stage without cooling down in-between. Processes of this type are known as direct-crystallization processes. DE 103 49 016 and DE 10 2004 015 515, for example, describe so-called latent heat crystallization processes wherein crystallization is effected using solely the intrinsic heat of the pellets. But these processes have the disadvantage that they are unable to meet the required flexibly adjustable and homogeneous quality of the output with regard to temperature and crystallinity. The frequent formation of agglomerates in the upstream-end region of the crystallization zone is a further disadvantage because they do not always break up again completely.

Better results are obtainable when the crystallization of the still hot pellets is effected by additional heating with a hot process gas. This is generally suggested, for example, in U.S. Pat. No. 3,544,525, but that document does not disclose process details. As discussed below, said method is associated with several drawbacks.

WO 2008/071023 describes a process wherein still hot pellet material is separated from the cooling medium in a pellet dryer and subsequently transferred into a crystallizer where it is treated under defined conditions. Both the pellet dryer and the crystallizer are operated here under an air atmosphere. Evaporated cooling medium can be removed by means of air. The flow velocity of the process gas in the crystallizer has to be above the loosening point of the polycondensate, and the polycondensate pellets have to exhibit a narrow spectrum of residence time in the crystallizer, in order to obtain homogeneously crystallized polycondensate pellets. In order to obtain a narrow spectrum of residence time, at least in parts of the crystallizer a strong turbulence has to be prevented. These specific process conditions are limiting and thus disadvantageous.

However, crystallization is not always possible under an air atmosphere, since oxidative degradation can occur at the high temperatures of crystallization. With certain materials/quality requirements, therefore, it is necessary to crystallize under an inert gas atmosphere.

U.S. Pat. No. 3,544,525 mentioned above describes a process wherein polymer melt is formed into a prepolymer pellet material via an underwater pelletization. The pellet material is subsequently dried in a dewatering unit (pellet dryer) and transferred into a crystallization device where it is crystallized with hot inert gas.

This process has various disadvantages. In addition to crystallization control and homogeneity being unsatisfactory, the design of the pellet dryer as a closed system causes an overpressure to develop therein due to the evaporating cooling liquid (water). As a consequence, the water is forced out of the pellet dryer and into the crystallizer and carried into the adjoining SSP reactor. Although the prepolymer is described as relatively dry in U.S. Pat. No. 3,544,525 after passing through the pellet dryer, the SSP reactor nonetheless has a high moisture content which is absorbed by the process gas flowing through the SSP reactor. Before returning into the SSP reactor, the process gas has to be freed of water in additional units (a condenser and a dryer), which is inconvenient. Alternatively, the moist process gas can be disposed of and replaced with fresh dry process gas. This variant is costly and hence unsatisfactory. In addition, the high moisture content of the SSP reactor causes the pellets to cool down, since the water adheres to the pellets and has to be evaporated. More process gas is accordingly needed in the SSP reactor to achieve the desired reaction temperature, and this is economically disadvantageous.

The problem addressed by the present invention was that of providing a process and apparatus for direct crystallization of polymer which do not have the disadvantages of the prior art.

It was found according to the present invention that, surprisingly, the disadvantages of the prior art are overcome when crystallization in the crystallizer is conducted with specific supply of energy from the exterior.

The present invention relates to a process for continuous production of partly crystalline polycondensate pellet material, comprising the steps of a) forming a polycondensate melt into pellet material by adding a liquid cooling medium, which has a temperature below the glass transition temperature (Tg) of the polycondensate, and cooling to an average pellet temperature within the range of temperature of crystallization of the polycondensate, wherein cooling takes place before or during or after forming to pellets;

b) separating the liquid cooling medium from the pellet material in a first treatment space, wherein the pellets after exit from the first treatment space exhibit a temperature $T_{GR}$, c) crystallizing the pellet material in a second treatment space, wherein in the second treatment space fluidized bed conditions exist, and in the second treatment space the pellets are heated by supply of energy from the exterior by means of a process gas, wherein the process gas has a temperature $T_{Gas}$, which is higher than the sum of the pellet temperature $T_{GR}$ and the temperature increase $T_{KR}$ which occurs due to heat of crystallization released in the second treatment space, i.e. $T_{Gas}>(T_{GR}+T_{KR})$, and wherein the pellets at the exit from the second treatment space have an average temperature $T_{PH}$, which is 5 to 70° C. higher than the sum of the temperature of the pellets $T_{GR}$ and the temperature increase $T_{KR}$ which occurs due to heat of crystallization released in the second treatment space, i.e. $(T_{GR}+T_{KR}+70°\ C.)\geq T_{PH}\geq(T_{GR}+T_{KR}+5°\ C.)$.

The present invention furthermore relates to a device for performing the above described method, comprising
  a unit for forming pellets with a line for supply of a cooling medium and a line for discharge of a mixture of pellets/cooling medium,
  a drying unit located downstream of the unit for forming pellets, providing a first treatment space,
  and a crystallizer located downstream of the drying unit, providing a second treatment space and being provided with each an inlet and outlet for the pellets and a gas, so that in the second treatment space the gas can be led through the pellets under fluidized bed conditions,
wherein the crystallizer is provided at the outlet for the pellets with a shut-off device, preferably a rotary air lock unit with a housing and a rotor movably arranged therein and having a gap between the rotor and the housing which is larger than the average diameter of the pellets.

The present invention is provided for treating crystallizable polycondensates. Suitable polycondensates include crystallizable thermoplastic polycondensates, for example polyamides, polycarbonates, and polyesters including polyhydroxy alkanoates, polylactides or their copolymers, which are obtained via a polycondensation reaction by eliminating a low molecular weight reaction product. The polycondensation in question can take place directly between the monomers or via an intermediate stage which is subsequently converted by transesterification, in which case the transesterification can in turn take place by eliminating a low molecular weight reaction product or via ring-opening polymerization. Essentially, the polycondensate thus obtained is linear, wherein a low number of branching can be generated.

Polycondensates of a certain type of polymer are each made from the same main monomers. A limited amount of further monomers, so-called co-monomers, can be used therein.

Polyamides are polymers usually obtained via polycondensation from a diamine component with the general structure $H_2N$—R1-$NH_2$ and a dicarboxylic acid component with the general structure HOOC—R2-COOH, wherein R1 and R2 typically are optionally substituted, linear or branched aliphatic hydrocarbons with 1 to 15 carbon atoms, aromatic or heteroaromatic hydrocarbons with 1 to 3 aromatic rings, cyclic hydrocarbons with 4 to 10 carbon atoms or heterocyclic hydrocarbons with 1 to 3 oxygen or nitrogen atoms and 3 to 10 carbon atoms.

Instead of the dicarboxylic acid, also its corresponding dicarboxylic acid halogenide, preferably dicarboxylic acid chloride, can be used.

Examples of such polyamides are PA6,6, which is made from hexamethylene diamine and adipic acid, or PA-mXD6, which is made from m-xylylene diamine and adipic acid.

Polyamides are also polymers with repeating amide groups with the general structure H—[N(H)—R—CO]x-OH, wherein R typically is an optionally substituted, linear or branched aliphatic hydrocarbon with 1 to 15 carbon atoms, aromatic or heteroaromatic hydrocarbon with 1 to 3 aromatic rings, cyclic hydrocarbon with 4 to 10 carbon atoms or heterocyclic hydrocarbon with 1 to 3 oxygen or nitrogen atoms and 3 to 10 carbon atoms.

Polyamides are also polymers which are made by ring-opening polymerization from heterocyclic monomers with at least one amide group, such as for example polycaprolactame (PA6), which is manufactured from caprolactame.

Polyesters are polymers typically obtained via polycondensation from a diol component with the general structure HO—R1-OH and a dicarboxylic acid component with the general structure HOOC—R2-COOH, wherein R1 and R2 typically are optionally substituted, linear or branched aliphatic hydrocarbons with 1 to 15 carbon atoms, aromatic or heteroaromatic hydrocarbons with 1 to 3 aromatic rings, cyclic hydrocarbons with 4 to 10 carbon atoms or heterocyclic hydrocarbons with 1 to 3 oxygen or nitrogen atoms and 3 to 10 carbon atoms.

Usually linear or cyclic diol components and aromatic or heterocyclic dicarboxylic acid components are used. The ester, usually the dimethyl ester of the dicarboxylic acid can also be used instead of the dicarboxylic acid itself.

Typical examples of polyesters are polyethylene terephthalate (PET), polybutylene terephthalate (PBT), polytrimethylene terephthalate (PTT), polyethylene furanoate (PEF), polytrimethylene furanoate (PTF), polybutylene succinate (PBS and polyethylene naphthalate (PEN), which are each used either as homopolymer or as copolymers.

An example is polyethylene terephthalate, which is obtained from its monomers, a diol component and a dicarboxylic acid component, the main diol component being ethylene glycol (1,2-ethanediol) and the main dicarboxylic acid component being terephthalic acid. Possible comonomers include further linear, cyclic or aromatic diol and dicarboxylic acid component compounds. Typical comonomers are diethylene glycol (DEG), isophthalic acid (IPA) or 1,4-bishydroxymethylcyclohexane (CHDM).

A further example is polyethylene furanoate, which is obtained from its monomers, a diol component and a dicarboxylic acid component, the main diol component being ethylene glycol (1,2-ethanediol) and the main dicarboxylic acid component being 2,5-furane dicarboxylic acid. Possible comonomers include further linear, cyclic or aromatic diol and dicarboxylic acid component compounds. Typical comonomers are diethylene glycol (DEG) or trimethylene glycol.

Polyesters are also polymers with repeating ester groups with the general structure H—[O—R—CO]$_x$—OH, wherein R typically is an optionally substituted, linear or branched aliphatic hydrocarbon with 1 to 15 carbon atoms, aromatic or heteroaromatic hydrocarbon with 1 to 3 aromatic rings, cyclic hydrocarbon with 4 to 10 carbon atoms or heterocyclic hydrocarbon with 1 to 3 oxygen or nitrogen atoms and 3 to 10 carbon atoms.

An example are polyhydroxy alkanoates with the general structure H—[O—C(R)H—$(CH_2)_n$—CO]$_x$—OH, wherein R is usually hydrogen, or a linear or branched aliphatic hydrocarbon with 1 to 15 carbon atoms and n=1 to 10. Examples are poly-4-hydroxybutyrate and poly-3-hydroxyvalerate.

A further example are polylactides with the general structure H—[O—C(R)H—CO]$_x$—OH, wherein R is typically a methyl group or an aliphatic hydrocarbon with 1 to 15 carbon atoms.

A further example is the polyglycolic acid with the general structure H—[O—$CH_2$—CO]$_x$—OH].

Polyesters are also polymers which can be made by ring opening polymerization from heterocyclic monomers with an ester group, such as for example polycaprolactone from caprolactone, or by ring opening polymerization from heterocyclic monomers with at least two ester groups, such as polylactide from lactide.

The most common polylactide is polylactic acid with the structure $H-[O-C(CH_3)H-CO]_x-OH$. Due to the chirality of the lactic acid, there exist different forms of polylactic acid. Homopolymers are poly-L-Lactide (PLLA), which is usually made from L,L-lactide, and Poly-D-lactide (PDLA), which is usually made from D,D-lactide.

Copolymers such as poly-(L-lactide-co-D,L-lactide) contain little amounts of lactide units with chirality that it different from that of the main monomer.

Polyesters can also be manufactured by biosynthesis using microorganisms, or in plant cells, where they are obtained by destruction of the cell.

Suitable polycondensates can be crystallizable homopolymers. Despite the designation as homopolymer, during the manufacturing process thereof a small amount of comonomers may be formed. Thus, during manufacture of polyethylene terephthalate, it is known that diethylene glycol is formed from ethylene glycol. However, many suitable polycondensates are crystallizable copolymers which contain a certain amount of comonomer. The comonomers can be introduced into the manufacturing process of the polycondensate as portion of the monomers, or they are formed as part of the manufacturing process, typically resulting in an arbitrary distribution. The comonomers may also be introduced in the form of blocks, manufactured from different monomers, resulting in so-called block copolymers.

Typical amounts of one or more comonomers are from 1% to about 30%. Due to the fact that in many cases an excessive amount of comonomer completely prevents crystallization, the maximum amount of comonomer may be limited to below 20%, preferably below 10%.

Suitable polycondensates may be mixtures of polymers which may contain an arbitrary number and amount of different types of polymers. A small amount of a polymer may act as nucleating agent in a polycondensate and thus increase its rate of crystallization. Specific mixtures of polycondensates can form mutually interacting crystal structures with crystallization characteristics which differ from that of the individual components.

A respective example is a mixture of PDLA and PLLA, which forms a stereocomplex crystal structure with increased crystallinity.

After polymerization, each polycondensate chain has chain-terminating groups with typically a functionality of at least one of its monomers. As an example, a polyester chain may have one or more hydroxyl and/or carboxyl end groups. A polyamide chain may have one or more hydroxyl and/or amino end groups. Such terminal groups may be modified by a so-called end-capping reagent, or they can be modified due to a degradation reaction. Although this was not specifically mentioned with respect to the above general structures, suitable polymers may have such modified terminal groups.

The polycondensate can be virgin material or a recyclate. Recyclates are reprocessed polymers from the production and processing operations (post-industrial) or polymers collected and reprocessed after having been used by consumers (post-consumer).

Additives may be incorporated in the polycondensate. Suitable additives include, for example, catalysts, dyes and pigments, UV blockers, processing aids, stabilizers, impact modifiers, blowing agents of the chemical and physical kinds, fillers, nucleating agents, flame retardants, plasticizers, particles to improve the barrier or mechanical properties, reinforcing articles, such as balls or fibres, and also reactive substances, for example oxygen absorbers, acetaldehyde absorbers or molecular weight enhancers.

The unit which is used in the present invention for forming a polycondensate pellet material is fed with a polycondensate melt as starting material. The polymer melt is produced using reactors or devices known in the prior art (e.g., Scheirs/Long (eds.), Modern Polyesters, Wiley 2003, especially pp. 31-104). In-principle possibilities include polymerization reactors in which the polycondensates are produced in the liquid phase, for example stirred tanks, cage reactors or disc reactors, or else equipment where previously produced polycondensates are melted, for example extruders or kneaders. Polycondensate melt production can be continuous or batchwise. However, continuous processes are preferable for further processing.

Individual strands of polycondensate are formed from the polycondensate melt in an exit apparatus, especially a die or die-plate. To produce pellets (i.e. particles of defined shape and size) from the strands of polycondensate, the pelletization techniques known in the prior art, such as strand pelletization, water-ring pelletization, underwater pelletization or hot face pelletization, can be used. In pelletization, the strands of polycondensate which exit from the melt channels are solidified and separated into a multiplicity of individual pellets before or after solidification. Separation is effected, for example, by autogenous droplet formation, by the use of a liquid shearing medium or by mechanical severing, especially cutting. While droplet formation, whether autogenous or forced by a shearing medium, takes place at the die exit, cutting can not only take place directly at the die exit, but also only after passage through a treatment sector.

The polycondensate melt is solidified by cooling with at least one liquid cooling medium or a mixture of different liquid cooling media. Especially suitable cooling media are liquids which have a high specific capacity of heat, preferably higher than 2 KJ/(kg K), and a sufficiently high boiling point, preferably higher than 90° C., and which essentially do not attack or modify the polycondensate and do not leave behind any toxic residues in the polycondensate. According to a preferred embodiment of the invention, a single liquid cooling medium is used. Water or ethylene glycol or mixtures thereof are preferred. An especially preferred cooling medium is water.

The polycondensate, especially in the form of polycondensate strands or in the form of droplets, can, for example before entry into the liquid cooling medium, flow through a sector which contains a process gas, especially air or water mist. Notwithstanding the use of the term "water" in the designation of pelletizing means, other liquid media can also be used. Cooling can take place according to the present invention before, during or after the forming of the material into pellets.

According to a first embodiment of the invention, when entering the unit for forming the pellets the liquid cooling medium has a temperature which is below the glass transition temperature (also called glass transition point, abbreviated with Tg) of the polycondensate to be shaped. In the case of polyesters, the pellets begin to agglomerate above the glass transition temperature of the material, i.e. the particles stick together forming agglomerates. For example, the glass transition temperature of polyethylene terephthalate is about 75° C. to 82° C. (depending on the comonomer content and the kind of added comonomers).

The glass transition temperature of a polycondensate may be determined with a DSC (digital scanning calorimetry) measurement. DSC is a conventional method commonly known to a skilled person. Devices for performing DSC measurements are also commonly known and commercially available. For example, the device Mettler DSC81 may be mentioned. For measuring the glass transition temperature of a polycondensate, such as a polyester, for example 5-25 mg of a respective polymer sample can be heated in a conventional Mettler DSC81 measurement device with a rate of 10° C./min from 25° C. to 290° C. The sample is kept at 290° C. for 1 min, then rapidly cooled down to room temperature and heated for a second time with a rate of 10° C./min from 25° C. to 290° C. The glass transition temperature is determined from the second run. As Tg, the point of inflection of the respective peak in the DSC is taken.

According to a preferred embodiment of the invention, the liquid cooling medium, preferably water, depending on the Tg of the polycondensate to be shaped correspondingly has a temperature of less than 85° C., particularly preferred of between 50° C. and 80° C. and especially preferred of between 60° C. and 75° C.

According to a further embodiment of the present invention, the liquid cooling medium when entering the unit for forming the pellets has a temperature which is more than 50° C., but lies at least 10° C. below its boiling point. In the case of water, according to this embodiment the temperature of the cooling medium at normal pressure is thus 50° C. to 90° C. The boiling point is known to be dependent on pressure; with decreasing external pressure the boiling point decreases, and vice versa.

According to a preferred embodiment of the invention, the liquid cooling medium is guided through a circular system, for economic reasons. During the pelletization mentioned above, however, the amount of liquid cooling medium (preferably water) decreases, since a part thereof evaporates. This applies in particular to embodiments where pelletization is carried out in a liquid cooling medium with increased temperature. The portion of liquid cooling medium escaping the circular system has to be regularly replaced, in order to provide the amount of cooling medium in the system which is required for pelletization. The amount of fresh cooling medium thus typically is 5 to 200 litres per ton of manufactured polycondensate pellets. Optionally, evaporated cooling medium can be condensed and led back into the circular system, resulting in a decrease of fresh cooling medium.

In U.S. Pat. No. 7,446,162, normal tap water ("city water") is suggested as replacement for escaped liquid cooling medium, optionally together with additives for the control of water hardness or for complying with directives for corrosion. However, no further respective details are provided.

It was found, however, that this procedure is disadvantageous. If a liquid cooling medium comprising lager amounts of non-volatile components is added to the circular system, over a longer period of time an uncontrolled enrichment of those non-volatile components in the circular system takes place. This can lead to undesirable drawbacks such as deposition of limescale in the circular system, which can only prevented to a certain degree by the addition of additives.

Moreover, during pelletization of polycondensates side products from the process of preparation of the polycondensate (such as monomers, oligomers or cleavage products formed therefrom) enter into the liquid cooling medium. Particularly critical is here the entering of acidic components (such as the acid component of polyesters or cleavage products from polyester monomers) into the liquid cooling medium, since herewith the pH value of the cooling medium is lowered. As a consequence, due to corrosion the life time of metallic components of the unit, especially the die plates or the cutting knifes, is lowered.

According to an embodiment of the present invention, the above problems are overcome by adjusting and keeping the pH value of the liquid cooling medium present in the circular system to a value of more than 4, preferably to a value in the range from 4 to 7. This can be achieved, for example, by adding to the liquid cooling medium (preferably water) which is given to the circular system as replacement for escaped cooling medium, a basic medium or a pH buffer medium. Alternatively, the basic medium or the pH buffer medium can also be given directly into the circular system.

According to a preferred embodiment of the present invention, to the circular system there is added an amount of 0.0005-0.05 mol, preferably 0.0015-0.05 mol, especially 0.005-0.05 mol, of basic medium or pH buffer medium per ton of polycondensate to be pelletized. Therewith, it is ensured that under conditions of pelletization of the invention the pH value of the liquid cooling medium in the circular system is kept above 4 and preferably in the range from 4 to 7.

As basic medium, organic or inorganic components may be used, but also ampholytes such as glycine may be used.

As basic pH buffer medium, organic or inorganic buffer systems may be used which stabilize the pH value at a level of more than 4, preferably in the range from 5-9. Examples are phosphate, hydrogenphosphate, carbonate or hydrogencarbonate buffers, which have to be soluble in the liquid cooling medium.

According to a preferred embodiment of the invention, a carbonate buffer, such as sodium carbonate, or a hydrogencarbonate buffer, such as sodium hydrogencarbonate or calcium hydrogencarbonate, are used as pH buffer medium.

The determination of the pH value of a liquid medium is commonly known and does not have to be explained here in detail.

According to a particularly preferred embodiment of the invention, as replacement for escaped cooling medium the circular system is provided, as liquid cooling medium (preferably water), with fresh water having a carbonate hardness of 0.2 to 5° fH, preferably 0.5 to 5° fH. Carbonate hardness is the amount of earth alkaline ions, mainly magnesium ($Mg^{2+}$) and calcium ($Ca^{2+}$), and traces of barium ($Ba^{2+}$) and strontium ($Sr^{2+}$), which together with carbonate ions ($CO_3^{2-}$) and hydrogencarbonate ions ($HCO_3^-$) are dissolved in the water. Carbonate hardness thus only comprises the earth alkaline ions which are present as dissolved carbonates or hydrogencarbonates. ° fH here is the hardness in French degrees, wherein 1° fH is 0.1 mmol of earth alkaline ions per liter.

The adjustment of water hardness is typically made by partial softening of untreated fresh water, wherein usually completely softened water is mixed with untreated fresh water.

When adjusting the water hardness, addition of chloride ions should be avoided. If necessary, a reduction of chloride ions to below 10 mg/l, in particular 2 mg/l, should be carried out.

According to a further preferred embodiment of the invention, furthermore a part of the liquid cooling medium is removed from the circular system, wherein this part corresponds to at least 10%, but not more than 100%, preferably 20 to 80%, of the amount of fresh cooling medium which is added to the circular system. Therewith, in particular an enrichment of chloride ions can be prevented, wherein a chloride content of 20 mg/l should not be exceeded.

According to a further preferred embodiment of the invention, the cooling medium in the circular system is adjusted in such a way that it contains, before being added to the polycondensate, oxygen in an amount of less than 7 mg/l, preferably less than 5 mg/l. This can be achieved, for example, by degassing the liquid cooling medium at elevated temperature, in particular at a temperature of above 60° C. Degassing can be carried out, for example, with a vacuum pump or a suction ventilator. Optionally, an open aeration opening allowing the escape of released oxygen gas is also sufficient. This is supported by a partial pressure of the oxygen as small as possible in the gas phase at the boundary of the cooling liquid, which can be achieved, for example, by addition of nitrogen or by evaporating cooling medium. Therewith, a constant quality of the liquid cooling medium is ensured, and a negative influence on the polycondensate is prevented.

The present invention is thus furthermore related to a process for continuous production of partly crystalline polycondensate pellet material, comprising the steps of
a) forming a polycondensate melt into pellet material by adding a liquid cooling medium, which has a temperature above 50° C., but at least 10° C. below its pressure-dependent boiling point, and cooling to an average pellet temperature within the range of temperature of crystallization of the polycondensate, wherein cooling takes place before or during or after forming to pellets;
b) separating the liquid cooling medium from the pellet material in a first treatment space,
c) crystallizing the pellet material in a second treatment space, wherein the liquid cooling medium is guided in a circular system, and wherein the liquid cooling medium before addition to step a) has a pH Value of more than 4, preferably 4 to 7.

Partly crystalline (or partially crystalline) polycondensate material here designates polycondensate pellets which comprise both amorphous zones and zones with crystalline structure.

The pellets obtained in this way shall preferably have a defined pellet shape, for example cylinder-shaped, sphere-shaped, droplet-shaped, sphere-like or a designed shape as proposed in EP 0 541 674 for example. Average pellet size shall be between 0.1 mm and 10 mm, preferably between 0.5 mm and 3 mm and especially preferred between 0.85 mm and 2.5 mm.

The average pellet size is the statistical mean value of the average pellet diameter, which is derived from the ratio of pellet height, pellet length and pellet width (which can be measured by known methods). The pellet size distribution should be kept within a narrow spectrum. According to a preferred embodiment, the standard deviation of the weights of 100 measured pellets is between 2 and 20%.

According to the present invention, the pellet material obtained is subjected to direct crystallization, i.e. the pellet material is not cooled down so severely (to room temperature, for example) that for a subsequent crystallization it would have to be heated with high energy requirements. According to the present invention, the pellet material is cooled down to an average pellet temperature which is within the crystallization temperature range of the polycondensate. This is achieved by choosing the temperature of the cooling medium as described above and by optionally choosing a correspondingly short residence time for the pellet material in the cooling medium. According to a preferred embodiment of the invention, separation of the cooling medium from the pellets takes place within 0.1 to 5 s, especially preferred within 0.3 to 3 s after addition of the cooling medium. Concurrently with the cooling, the polycondensate pellets can be conveyed into a further processing step.

The average pellet temperature here designates the mean value of the temperatures of the individual pellets, wherein each pellet has a mean temperature which is established after a balance of the temperature profile in the pellets without heat exchange with the exterior has been reached.

The suitable range of temperature for the crystallization becomes apparent on plotting the crystallization half time (t½) as a function of the temperature. Said range is upwardly and downwardly limited by the temperature at which the crystallization half time is approximately equal to 10 times the minimum crystallization half time (t½ min). Since very short crystallization half times (t½) are very difficult to determine, t½ min=1 minute is used as minimum value. In the case of polyethylene terephthalate, for example, the suitable crystallization temperature range is between 110 and 220° C.; in the case of polyethylene furanoate the suitable crystallization temperature range is between 110 and 190° C., and in the case of poly-L-lactide the suitable crystallization temperature range is between 80 and 140° C.

The crystallization half time (t½) is determined by isothermal crystallization in the DSC (differential scanning calorimetry). The crystallization half time corresponds to the time which, at a given temperature, is needed to attain 50% of the attainable crystallinity. The minimum crystallization half time (t½ min) is the shortest crystallization half time which can be attained in the crystallization temperature range.

According to a preferred embodiment of the invention, in the case of polyethylene terephthalate (PET) as polymer for treatment, the pellet material is cooled down to a temperature in the range from 110 to 180° C., preferably from 115 to 160° C. and more preferably from 120° C. to 150° C.

After cooling, the cooling medium is separated from the pellets. Optionally, the pellets are subjected to a further treatment (conditioning) in a liquid medium, for which directly the cooling medium or some other liquid can be used.

The pellets can be separated from a liquid cooling medium using separating apparatuses known in the prior art. They may merely be passive separating apparatuses, for example grids or grills, through which the cooling medium can pass but not the pellet material. Active separating apparatuses are usually used for at least part of the separation, the separation being effected for example due to a gas through-flow, a centrifugal force or an impact. Apparatuses of this type are known for example as suction apparatuses, impact dryers or centrifugal dryers. A centrifugal dryer is preferred.

According to a preferred embodiment of the present invention, the pellets are separated from the cooling medium in a two-step process, i.e. according to the present invention the step of separating the liquid cooling medium from the pellets may comprise the above described separation and subsequent drying of the pellets. After a first separation with the above described separating apparatuses, according to this preferred embodiment during the step of separating from the cooling medium the pellets are furthermore subjected to a drying step in order that the cooling medium may be completely separated from the pellet material. For this, the pellet material is transferred from an above-described unit for forming the pellet material via a connection line into a unit for separating the cooling medium and into a unit (drying unit) for drying the pellet material. The transfer of the pellet material into the drying unit is effected at such a rate of speed that the pellet material does not cool down below its crystallization temperature range. The flow velocity of the pellet material in the connection line can be increased by importing air or some other suitable gas into the connection line.

Units for drying a pellet material (drying units) are known from the prior art. The preference of the present invention is for using a reactor in which a first treatment space is provided. Inside the reactor, the cooling medium (generally water) is separated off and, in the first treatment space, the pellet material separated off is dried by evaporating the cooling medium. To evaporate the cooling medium, a temperature in the range from 100 to 200° C., preferably from 110° C. to 160° C. and more preferably from 120 to 150° C. is applied to the first treatment space. The residence time of the pellet material in the first treatment space is preferably in the range from one tenth of a second up to 10 seconds.

According to a preferred embodiment of the invention, after exit from the first treatment space the pellets exhibit a temperature $T_{GR}$ in the range from 100-180° C., preferably 120° C. to 160° C.

The pellet dryer of the present invention has at least one feed-in opening for importing the pellet material into the unit. The feed-in opening can be for example an opening in the housing, or the point of exit from a pipe leading into the housing. The pellet dryer of the present invention further has at least one discharge opening for exporting the pellet material out of the unit. The discharge opening can be for example an opening in the housing or the point of entry into a pipe leading out of the housing. Furthermore, the drying unit of the invention comprises at least one discharge opening for removing the liquid cooling medium from the unit.

A gas phase is present in the first treatment space and absorbs the evaporating cooling medium. According to the present invention, the gas is preferably air. But other gas mixtures having a lower oxygen content than air can also be used. An inert gas need not be used. In exemplary embodiments, the oxygen content of the first treatment space can be more than 1% by weight, preferably more than 5% by weight and more preferably more than 10% by weight. To avoid oxidative degradation of the material, however, the oxygen content of the first treatment space should not exceed the oxygen content of air (around 21%).

The drying unit of the present invention preferably is not a closed unit. The drying unit of the present invention preferably has at least one exit opening for exporting gas, preferably air. In a preferred embodiment of the present invention, the exit opening of the drying unit empties into a gas exportation line which accommodates a ventilator for air circulation through the drying unit.

The drying unit of the present invention may further have at least one entry opening for importing gas, preferably air. The entry opening in this case is disposed at the opposite end of the first treatment space from the exit opening in order that complete flow of gas through the first treatment space may be ensured. However, it is also possible for the entry opening for importing gas to be disposed in the connecting unit immediately downstream of the drying unit and not in the drying unit itself.

In a preferred embodiment of the present invention, the gas passes to the entry opening via an aspirating filter. A ventilator for air circulation through the drying unit can be disposed in the gas line leading to the entry opening. This ventilator can be provided in addition to or in place of the ventilator in the gas exportation line. In a preferred embodiment of the present invention, therefore, a ventilator is only provided in the gas importation line.

In a further embodiment of the present invention, the line leading to the entry opening and the line leading away from the exit opening can communicate with each other to form a closed-loop circuit. In this embodiment, however, the gas first has to pass through a condenser before re-entry into the first treatment space in order that the evaporated cooling medium in the gas may be separated off.

The apparatus of the present invention preferably has a cooling-medium circuit. The cooling medium is fed from a stock reservoir vessel (tank), preferably via a circulating pump and optionally a heat exchanger (for selectively heating or cooling the cooling medium), into the forming unit (pelletization apparatus). The cooling medium separated off in the drying unit can be led back into the stock reservoir vessel via a pipework line.

Given a constant ratio of air importation and exportation, a pressure increase will occur in the first treatment space during the drying operation, since the liquid cooling medium transitions into the gaseous state and the gas phase in the first treatment space increases.

Separation of the polycondensate pellets from the liquid cooling medium is followed by a direct transfer into the subsequent crystallizer, which comprises a second treatment space. This, according to the present invention, is accomplished by means of a connection line which is disposed between the drying unit and the crystallizer and connects the discharge opening of the drying unit to the inlet opening of the after-connected crystallizer. The connection line is preferably configured such that the material to be treated can pass unimpeded from the pre-connected unit to the downstream unit. Preferably, there are accordingly no shut-off devices in the connection line. This is intended to rule out the risk of the hot, tacky particles of the polymer adhering in the connection line. The connection line can have a gas inlet.

Constant relative movement between the individual pellets should be ensured in the connection line in order that their agglomeration due to stickiness may be prevented. The relative movement is achievable, for example, via a high flow velocity in the connection line (greater than 0.3 m/min, especially greater than 1 m/min), via an encircling flow with a conveying gas, via mechanical movement, for example using a stirrer or conveying screw, or by generating a vibration or oscillation.

Optionally, between drying unit and crystallizer a sieve is provided, through which individual pellets with specified size can protrude unobstructed, but which holds back pellet agglomerates and too large pellets.

In order that, in the event of a system upset of the crystallizer, inconvenient and costly exportation of material may be avoided, the connection line of the present invention can, as described in WO 2008/071278, communicate with an intermediate store into which the material is passed by a controlling apparatus in the event of a system upset and is stored therein under conditions (especially pellet temperature below pellet glass transition point) where agglomeration of the pellets does not occur. The corresponding content of WO 2008/071278 is hereby expressly incorporated herein by reference.

As the pellet material to be treated enters the crystallizer it is in general essentially amorphous, i.e. its crystallinity is less than 10%, preferably less than 5%. According to the present invention, pellet material made of polyethylene terephthalate (PET) preferably has an IV value of 0.4 to 0.8 dl/g, especially 0.5 to 0.65 dl/g, before entry into the crystallizer. The IV value indicates the intrinsic viscosity of a polymer and is a measure of its molecular weight. The IV value and its determination are known from the prior art. The intrinsic viscosity (IV) is determined, according to the present invention, according to the following method: For determining the solution viscosity, a mixture of phenol/dichlorobenzene (50:50 wt.-%) is used as solvent. The polyester sample is dissolved during 10 minutes at 130° C. with a concentration of 0.5% (0.5 g/dl). Measurement of the relative viscosity (R.V.) is carried out at 25° C. with an Ubbelohde viscosimeter (according to DIN norm no. 53728, part 3 dated January 1985). The relative viscosity is the quotient of the viscosity of the solution and the viscosity of the pure solvent, which is comparable to the ratio of the corresponding capillary flow velocities. According to the Huggins equation, the value of the intrinsic viscosity is calculated from the measured relative viscosity;

$$I.V. = \frac{\sqrt{1 + 4K_H(R.V.-1)} - 1}{2 \cdot c \cdot K_H}$$

With the above conditions of measurement (polymer concentration c=0.5 g/dl and Huggins constant ($K_H$=0.35), the above equation becomes:

$$I.V. = \frac{\sqrt{1 + 1.4(R.V.-1)} - 1}{0.35} \quad (dl/g)$$

The viscosity of the polyester can be indicated either as intrinsic viscosity (IV) or as average molecular weight (number average: Mn). For converting an IV value, measured in phenol/dichloromethane=1:1, into the average molecular weight, the equation $$IV = k \cdot Mn^a$$

is used, wherein $k=2.1 \cdot 10^{-4}$ and $a=0.82$.

This equation can be generally applied to published data, unless a different solvent mixture and the corresponding conversion factors are indicated.

According to a preferred embodiment of the present invention, the polycondensate pellets flow essentially downwardly through the second treatment space, while a process gas flows through the second treatment space in counter-current or alternatively in cross-current or in co-current. Polymer particle movement in the crystallizer is due to mechanical movement or preferably due to the stream of process gas.

The process gas can be, for example, air, steam or inert gases such as nitrogen or $CO_2$. The process gas can comprise a mixture of several process gases. The process gas may comprise additives, which either react with the polycondensate to be treated, have a swelling action on the polycondensate, or deposit passively on the polycondensate pellets to be treated.

The crystallizer according to the invention is used in form of a fluidized bed. In other words, in the entire second treatment space, or at least in a partial section of the second treatment space, which is provided by the crystallizer, the conditions of a fluidized bed are established.

A fluidized bed is a bulk of solid particles which by means of an upwardly flow of a fluid are brought into a fluidized state. Spouted bed and moving bed are embodiments of a fluidized bed, resulting from different fluid flow and respectively different intensity of fluidization.

The second treatment space is surrounded by a housing. The horizontal cross section of the treatment space can have any desired shape, but preferably is round or rectangular. The disposition of the treatment space is preferably essentially vertical, so the pellet material can flow downwardly through the apparatus. It is important here to achieve a product flux which is uniform. The second treatment space is laterally limited by a casing. The casing wall can consist of cylindrical or conical segments or of a combination of conical and cylindrical segments, whereby the gas speed distribution can be influenced via the height of the apparatus. Widening in the ceiling region facilitates a reduction in the gas speed to prevent the discharge of pellets. Narrowing in the ceiling region facilitates an increased gas speed, leading to greater swirling to prevent any sticky agglomerations.

One particular embodiment of the present invention provides an at least approximately rotationally symmetrical housing casing, which results in fabrication advantages as well as advantages in respect of regularity of product flux.

In the interior of the second treatment space displacers can be provided which do not have pellet material flow through it and accordingly reduce the size of the second treatment space. Displacers of this type can be used for example for routing of process gas, for adjusting the free cross-sectional area or for improving pellet flux.

Inside the second treatment space, partition walls can be provided, which divide the second treatment space into two or more chambers, wherein the chambers may be connected with each other by means of passage openings for the pellets.

Preferably, at least one feed opening empties into the ceiling region of the second treatment space and facilitates the importation into the second treatment space of the pellet material to be treated. The feed opening can be for example an opening in the housing, or the exit from a pipe leading into the housing. The feed opening can be subdivided into two or more segments, which enables disbursement of the pellets in the treatment space.

Preferably, at least one discharge opening empties into the lower part of the second treatment space and the treated pellet material can be discharged there through from the treatment space. The discharge opening can be for example an opening in the housing or the entry into a pipe leading out of the housing. Usually, the pellet material travels in the direction of the discharge opening through a conical region. The angle of the outflow cone with the horizontal is preferably 50-80° when the pellet material is not fluidized or oscillated in the discharge cone and 15-60°, especially 30-50°, when the pellet material is fluidized or oscillated in the discharge cone. Alternatively, the pellet material can also be fed in the direction of the discharge opening via a mechanical discharge apparatus, for example a screw.

According to a preferred embodiment of the invention, a shut-off device, preferably a rotary air lock unit such as a cellular wheel lock, or a grooved roller unit, is located underneath the discharge opening and is used to control the efflux of pellet material out of the treatment space. The controlled variable here can be, for example, the fill height of the pellet material in the treatment space or the weight of the pellets in the apparatus.

Said shut-off device, preferably rotary air lock unit, is provided with a housing and a rotor movably arranged therein, wherein the shut-off device, preferably rotary air lock unit, comprises a gap between the rotor and the housing which is larger than the average pellet diameter.

Due to the fact that in a fluidized bed (moving bed or spouted bed) with such short residence time as defined according to the present invention there may be formed a portion of pellets with low crystallinity (which are very soft and deformable), the problem arises that in a subsequent shut-off device, which regulates the discharge of pellets from the fluidized bed (and which thus is always completely filled with pellets), a portion of the soft pellets may become squashed. According to a preferred embodiment of the present invention, this problem is solved by a discharge through a shut-off device, preferably a rotary air lock unit, with greater range of tolerance. By providing a gap between rotor and housing which is larger than the average pellet diameter, squashing of pellets in the shut-off device, preferably rotary air lock unit, is reduced or completely prevented.

By using such a shut-off device, preferably rotary air lock unit, with great range of tolerance, however the problem can occur that the crystallizer with the second treatment space at this discharge opening does no longer exhibit a reliable gas stop. For certain applications, this can be a serious drawback.

As a solution for this problem, according to a preferred embodiment of the present invention there is provided, downstream of the shut-off device, preferably rotary air lock unit, with great range of tolerance described above, a second shut-off device, preferably rotary air lock unit, with a housing and a rotor movably provided therein, which has a gap between rotor and housing which is smaller than the average pellet diameter. This second shut-off device, preferably rotary air lock unit, due to its size and optionally due to its speed of revolution, cannot be completely filled with pellets and thus cannot pinch or squash pellets. On the other hand, this second shut-off device, preferably rotary air lock unit, due to its dimensions is a reliable gas stop. The range of tolerance of the second shut-off device herewith preferably lies between 0.05 and 1 mm.

The basal region of the treatment space preferably locates one or more than one importing means for a process gas. The importing means has at least one entry opening where through the process gas flows into the second treatment space.

The feed means for a process gas may comprise apparatuses, for example open-base cones or series of ridge structures, or else lines or metal sheets with exit holes, as long as distribution of the process gas is sufficiently uniform. In one particular embodiment, the treatment space is downwardly limited by an at least to some extent gas-permeable barrier means, especially a perforated metal sheet with a multiplicity of entry openings where through process gas can flow in some places at least, but pellets cannot. To this end, the openings are smaller than the diameter of the pellets. The permeable area is preferably between 1% and 30%. Preference is given to openings at between 20 and 90%, especially between 30 and 80%, of the diameter of the pellets. The number, size and arrangement of the openings here can be uniform or non-uniform. The disposition of the barrier means is conical or horizontal.

Underneath the barrier means there can be a distributor space where through process gas is conducted to the barrier means. At least one opening for importing process gas empties into this distributor space. There can further be apparatuses for distributing the process gas, such as baffle plates, valves or flaps, or else separate channels for individual importation of process gas. Alternatively, the treatment space can be downwardly limited by a non-gas-permeable barrier means. In this case, the at least one importing means for a process gas can be an opening in the housing, the exit from one or more pipes leading into the housing, or a single ridge structure or a series of ridge structures, these having either holes or open bases. Any displacer here can be used for gas importation.

In one particular embodiment of the present invention, there is, in addition to the at least one feed means for process gas in the basal region of the second treatment space, at least one further process gas importation means which empties into the second treatment space, whereby a multi-stage heat supply as well as a multi-stage gas speed profile is achievable.

The ceiling region of the second treatment space preferably comprises at least one removal means for the process gas. The removal means can be for example an opening in the housing or the entry into a pipe leading out of the housing. The removal means in question can be situated in the casing or ceiling of the treatment space. In an alternative embodiment of the invention, no such removal means is provided. In this case, the process gas leaves the second treatment space through the connection line from the first to the second treatment space.

There can be devices within or underneath the removal means to permit the passage of process gas but prevent the passage of pellets. This can be effected for example with the aid of a curved or deflected through-flow channel or with the aid of deflecting internals, for example a zig-zag separator.

The pellet material is heated in the second treatment space by supply of energy from the outside, with the aid of the hot process gas. In this respect, the process gas is conducted into the second treatment space at a temperature $T_{Gas}$ which is higher than the sum of the pellet temperature $T_{GR}$ and the temperature increase $T_{KR}$ which occurs due to heat of crystallization released in the second treatment space, i.e. $T_{Gas}>(T_{GR}+T_{KR})$. The gas temperature $T_{Gas}$ thus lies above the average pellet temperature which the polycondensate pellets would reach within the second treatment space without external heat supply, the resulting advantage being that the polycondensate pellets can be set to a constant and defined exit temperature. According to the present invention, it could be shown that for obtaining a homogeneously crystallized polycondensate the external heat supply has to be carried out under consideration of the temperature increase $T_{KR}$ which occurs due to heat of crystallization released in the second treatment space.

According to a preferred embodiment of the present invention, the ratio X of the mass flows of gas ($m_G$) and pellets ($m_P$) ($X=n_G/m_P$) is adjusted in the second treatment space such that $1 \leq (T_{Gas}-T_{KR}-T_{GR})*X \leq 80$, preferably $2<(T_{Gas}-T_{KR}-T_{GR})*X \leq 80$, especially preferred $4<(T_{Gas}-T_{KR}-T_{GR})*X \leq 80$. By this, polycondensate with especially preferred characteristics of homogenous crystallization is obtained.

Due to the increase in crystallinity, heat of crystallization is released. Due to this heat of crystallization, there occurs a temperature increase $T_{KR}$ which results from the amount of released heat divided by the specific heat capacity of the polycondensate.

Generally, the temperature increase $T_{KR}$ in the second treatment space which results from the released heat of crystallization lies in a range from 5° C. to 40° C. In particular, in the case of polyethylene terephthalate (PET) $T_{KR}$ lies in a range from 10° C. to 30° C.

According to a preferred embodiment of the present invention, pellet material is heated in the second treatment space (i.e. in the crystallizer) to a temperature which is 30° C. or more below the melt temperature of the polycondensate. In the case of polyethylene terephthalate (PET), the pellets are preferably heated in the second treatment space (i.e. in the crystallizer) to a temperature in the range from 140 to 220° C., particularly preferred to 150° C. to 190° C.

According to a preferred embodiment of the present invention, the residence time of the material is preferably in the range from 1 to 30 crystallization half times. In the case of a rapidly crystallizing polymer such as polyethylene terephthalate (PET) having a comonomer content of less than 5%, the residence time is accordingly in the range from 1 to 30 minutes, preferably 1 to 15 minutes and especially preferred 1 to 8 minutes. Slow-crystallizing polymers accordingly have to be longer resident in the second treatment space until the desired increase in crystallinity has been attained.

According to a preferred embodiment of the present invention, the crystallization in the crystallizer is effected with an inert gas as process gas, in contrast to conventional processes. Use of nitrogen is preferred. In this respect, the oxygen content of the gas in the second treatment space shall be less than 1% by weight, preferably less than 0.5% by weight and more preferably less than 0.1% by weight in order to reduce/avoid oxidative damage to the material under the conditions of the crystallization.

Since heated process gases are costly, the invention provides that the process gas used in the crystallizer is preferably routed at least partly in a circuit system where a small amount of exchange gas can be imported and a small amount of exchange gas can be removed. In this preferred embodiment, there is a closed-loop circuit of pipework lines between the removal means and importation means for the process gas.

The circuit may contain further units, for example compression means (e.g. ventilators, blowers or compressors), heat exchangers (e.g. heaters), blocking devices (e.g. a valve or cock) or cleaning means (e.g. filters, cyclones, scrubbers or catalytic combustion means). Since a large proportion of the compression energy passes as heat into the gas stream, the elevated process gas temperature can also be maintained with less additional heater performance. However, if the entry temperature of the polycondensate pellets changes, this can be compensated by means of the additional heater performance. According to the present invention, the closed-loop circuit system preferably contains additional units selected from the group consisting of a ventilator, a heat exchanger such as a heater, a blocking device, a condenser and a combination thereof.

According to a preferred embodiment of the present invention, the crystallizer communicates with an inert gas tank, preferably via a feed line. Through the feed line, inert gas can be fed from the inert gas tank into the circuit system of pipework lines or directly into the crystallizer. Preferably, a metering unit, for example a control valve, is disposed in this feed line and can be used to control the importation of inert gas.

According to a preferred embodiment of the present invention, the pressure p2 in the second treatment space is set to be above the pressure p1 in the first treatment space. This prevents cooling medium transitioning from the first treatment space in the dryer into the second treatment space in the crystallizer. Owing to the higher pressure in the second treatment space, inert gas does transition from the second treatment space into the first treatment space. However, it has transpired that according to a preferred embodiment of the present invention it is sufficient for the purposes of the present invention when $p1<p2<p1+100$ mbar, preferably $p1<p2<p1+50$ mbar, i.e. the pressure in the second treatment space is less than 100 mbar, preferably even less than 50 mbar, above the pressure in the first treatment space. In other words, a slightly higher pressure in the second treatment space relative to the first treatment space is surprisingly sufficient. Under these pressure conditions, only a small proportion of inert gas is lost by transitioning into the first treatment space. This small disadvantage is more than compensated by the low moisture level in the crystallizer and the associated advantages with regard to equipment design and process engineering (smaller amount of inert gas needed in the crystallizer, inert gas needs minimal or no drying).

The apparatus of the present invention in one preferred embodiment comprises sensors to determine the pressure in the first and second treatment spaces. Conventional pressure sensors can be used, according to the present invention. The sensors communicate with a control unit which can evaluate the data ascertained by the sensors. The control unit according to this embodiment of the present invention is usually a computer having requisite components such as a central processing unit (CPU) and memories.

According to a preferred embodiment of the present invention, the control unit preferably communicates with the metering unit in the feed line and polices the metering unit to control the amount of process gas fed to the circuit system of the crystallizer. If, for example, the control unit uses the pressure values transmitted by the sensors to ascertain a pressure increase in the first treatment space, the metering unit is opened to let such an amount of process gas pass into the circuit system that the desired higher pressure in the second treatment space becomes established. Similarly, in the event of a pressure decrease in the first treatment space, a metering unit which is situated in a separate let-off line and likewise communicates with the control unit and is controlled thereby opens to let off process gas out of the circuit system in order to prevent excess pressure in the second treatment space with an attendant excess transition of process gas from the second treatment space into the first. Alternatively, the desired pressure difference between the first and second treatment spaces can also be set by opening appropriate metering means to increase or reduce the air importation into the first treatment space and/or the air exportation from the first treatment space.

If the inert gas quantity, which is needed to adjust the overpressure in the second treatment space desired according to a preferred embodiment of the present invention, is known or has been ascertained, according to a preferred embodiment of the present invention the apparatus can also be operated without control unit by passing the requisite quantity of inert gas into the crystallizer. However, even in this case it is at least advisable to police the pressure conditions in the first and second treatment spaces by means of pressure sensors. A further alternative embodiment provides no gas outlet from the second treatment space. In this case, the passing of inert gas into the second treatment space will inevitably lead to an increased pressure in the second treatment space relative to the first treatment space. This, at a certain minimum pressure gradient, will lead to the inert gas transitioning from the second into the first treatment space and thereby, in accordance with a preferred embodiment of the present invention, likewise prevents the ingress of water into the second treatment space.

According to a preferred embodiment of the present invention, any energy loss in the crystallizer due to possible evaporation of cooling medium from the pellet material is kept very small.

According to this preferred embodiment of the present invention, therefore, a small amount of process gas is needed to efficiently heat the pellet material to a temperature which corresponds to a temperature to be applied in any subsequent aftertreatment stage. According to a preferred embodiment of the present invention, therefore, further heating of the pellet material in an aftertreatment stage subsequent to the crystallization is only required to a minimal extent, if at all.

On exit from the second treatment space the pellet material preferably has a degree of crystallinity which is greater than 35% of the degree of crystallinity which could be maximally obtained at this crystallization temperature. In particular, on exit from the second treatment space the pellet material preferably has a degree of crystallinity which is between 40% and 70% of the degree of crystallinity which could be maximally obtained at this crystallization temperature. In the case of polyethylene terephthalate (PET), on exit from the second treatment space the pellet material has a degree of crystallinity between 20% and 50%, especially between 30% and 40%.

According to the present invention, the material obtained after the crystallization can be subjected to a further thermal treatment step, which is preferably selected from the group of a devolatilizing step, preferably a de-aldehydization step, and a solid-state polymerization (SSP). This thermal treatment step is carried out in a third treatment space, which is preferably situated in a separate reactor.

Both the devolatilization, preferably de-aldehydization, and the SSP reaction are known to a person skilled in the art and need not be further elucidated herein. According to the present invention, this thermal treatment is preferably carried out in a third treatment space in a gas phase of inert gas, and causes volatile components to evaporate from the polymer during the treatment and pass into the gas phase. Nitrogen is preferably used as the inert gas. According to the present invention, the oxygen content of the gas in the third treatment space shall be less than 0.1% by weight, preferably less than 0.05% by weight and more preferably less than 0.02% by weight in order to reduce/avoid oxidative damage to the material under the conditions of the crystallization.

Owing to the high temperature of the polymer entering the third treatment space, there is no need to pass very hot process gas into the third treatment space. Owing to evolving heat of crystallization, a temperature increase of 3 to 15° C., preferably of 5 to 15° C. and more preferably of 7 to 15° C. is generally observed in the third treatment space of the invention in the case of polyethylene terephthalate (PET). In the present invention, therefore, process gas passed into the third treatment space can in certain cases have a temperature below the temperature of the polymer particles in the third treatment space. The present invention accordingly ensures that a subsequent thermal treatment step can be carried out in an energy-efficient manner.

The flow of the process gas in the third treatment space is preferably in counter current to the stream of polymer particles. The same reactors can in principle be used in the thermal treatment as were described above for the crystallization, or other reactors conventionally used for this purpose. A conventional shaft reactor may be mentioned as an example.

The crystallized particles of polymer are transferred out of the crystallizer into the third treatment space in a known manner. For example, the particles can be pneumatically conveyed from the crystallizer into the third treatment space. Depending on the speed of conveyance, the polymer particles in the case of polyethylene terephthalate (PET) can cool down by between 2 and 15° C., preferably between 3 and 15° C. and more preferably between 5 and 15° C. If necessary, the particles can be additionally heated in a known manner before entry into the third treatment space.

According to the present invention, the de-aldehydization of, for example, polyethylene terephthalate can take place at a temperature of 140 to 200° C. in the third treatment space. A temperature increase in the third treatment space of 3 to 15° C. is observed in the course of this de-aldehydization, for example.

According to the present invention, the SSP reaction of, for example, polyethylene terephthalate can take place at a temperature of 180 to 240° C., preferably 180 to 225° C. in the third treatment space. A temperature increase in the third treatment space of 3 to 15° C. is observed in the course of this SSP reaction, for example.

The present invention will now be further elucidated using a non-limiting drawing, where FIG. 1 shows a schematic depiction of a preferred embodiment of an apparatus according to the present invention.

The apparatus according to FIG. 1 has a reactor 1 for producing a polymer melt. This can be a reactor in which a melt polymerization is carried out to thus produce a prepolymer from the monomers. Alternatively, reactor 1 can also be an apparatus for melting a solid product, for example a prepolymer. Reactor 1 can in this case be an extruder for example.

The molten material is transferred into a pelletization apparatus 2. In the pelletization apparatus 2, a pellet material is produced from the molten material in a known manner. This may involve, for example, an underwater pelletizer (as shown in FIG. 1) or an underwater strand pelletizer. Pelletization takes place under water in this case. The pellets obtained are concurrently cooled down in pelletizer 2. As noted, however, cooling must not be so severe as to cool the pellets to below their crystallization temperature range. This can be achieved via the use of heated water having a temperature above 50° C., but at least 10° C. below it pressure-dependent boiling point, in particular having a temperature below the Tg of the polycondensate, especially having a temperature from 60 to 80° C. The pellet material should in the case of polyethylene terephthalate (PET) be cooled to a temperature in the range from 110 to 180° C., preferably 115 to 160° C. and especially 120 to 150° C.

The pellet material is transferred via a connection line 3 directly into the unit for drying the pellet material (drying unit) 4. To stop the pellet material from cooling down too much, this pellet material should be conducted as quickly as possible out of the pelletization apparatus 2 and through the connection line 3. Preferably, the flow velocity in connection line 3 can be increased by passing a gas stream (preferably air) into it.

The pellet material is separated from the liquid cooling medium (water) and dried in the unit for drying the pellet material (drying unit) 4. The cooling medium separated off is conducted via a pipework line 9a back into the stock reservoir vessel (tank) 9b for the cooling medium. The stock reservoir vessel 9b has an inlet 9e for importation of cooling medium. From the stock reservoir vessel 9b, the cooling medium is transferred into the pelletization apparatus 2 by means of a circulation apparatus (pump) 9c. In the course of the transfer, the cooling medium preferably traverses a heat exchanger 9d. In the heat exchanger 9d, the cooling medium can be heated or cooled down, as required. Especially cooling medium returned from the drying unit 4 can have an excessive temperature because of the contact with hot pellet material and has to be cooled before entry into the pelletization apparatus 2.

The fresh cooling medium, which is added via the inlet 9e, can contain a basic medium or a pH buffer medium. In particular, the use of water with a neutralising or buffer effect which is adjusted within a narrow range is provided herein. Alternatively, the addition of a basic medium or of a pH buffer medium can also be effected directly into the cooling circular system, e.g. into the storage container 9b.

The drying of the pellet material in the first treatment space of unit 4 is effected at a temperature of 100 to 200° C., preferably 120 to 160° C., by means of air, or a gas atmosphere comprising essentially air, as well as a mechanical drying apparatus. In the apparatus of FIG. 1, the air is conducted into drying unit 4 via an air inlet 10a. The air inlet 10a can be situated in the housing of drying unit 4 or in the connection line 5 or in both locations. Optionally, an aspirating filter (not illustrated) can be disposed in the air inlet line 10a. The air leaves the drying unit 4 through the air outlet 10b. A ventilator 10c for circulating the air through the drying unit 4 is disposed in the air outlet line 10b in the apparatus of FIG. 1. However, the ventilator could alternatively also be disposed in the air inlet line 10a. Furthermore, air inlet 10a and air outlet 10b can be connected to each other to form a circuit system. A condenser would then have to be provided in this circuit system.

The pellet material is transferred from the dryer 4 via a connection line 5 directly into a crystallizer 6. To avoid pellet adherence and agglomeration, connection line 5 is not equipped with shut-off devices. The pellet material can transition unimpeded from dryer 4 into crystallizer 6.

In crystallizer 6, the essentially amorphous pellet material is at least partially crystallized. Within crystallizer 6, the pellets are kept moving by a gas stream passing through crystallizer 6. Within crystallizer 6, the conditions are those of a fluidized bed. Additionally, an apparatus for mechanical movement of the particles could also be provided in crystallizer 6.

The pellets are crystallized by external heat supply, wherein for external heat supply a process gas in counter current to the pellet flow is led through the second treatment space, said process gas having a temperature $T_{Gas}$ which is higher than the pellet temperature $T_{GR}$ and the temperature increase $T_{KR}$ in the second treatment space which occurs due to released heat of crystallization, i.e. $T_{Gas} > (T_{GR}+T_{KR})$. In the case of polyethylene terephthalate (PET) crystallization occurs at a temperature of 140 to 220° C., wherein at temperatures above 180° C. there is preferably used an inert gas, essentially nitrogen, as process gas. The crystallized pellet material departs the crystallizer via a discharge apparatus 7, for example a shut-off device such as a cellular wheel lock. Said cellular wheel lock is provided with a housing and a rotor movably arranged therein, which has a gap between rotor and housing which is larger than the average pellet diameter.

Alternatively, downstream of the cellular wheel lock there can be provided a second rotary air lock unit (such as a cellular wheel lock) with a housing and a rotor movably arranged therein, which has a gap between rotor and housing which is smaller than the average pellet diameter.

The pellets can be subjected to a subsequent thermal treatment such as a de-aldehydization or SSP reaction. Alternatively, the pellets can also be sent into a cooling step.

The process gas used in crystallizer 6 is conducted through a closed-loop circuit system of pipework lines 8a. The process gas enters crystallizer 6 through an inlet 6a and departs crystallizer 6 through the outlet 6b. The circuit system for the process gas contains a ventilator 8b for circulating the gas. A heat exchanger 8c is provided upstream of inlet 6a to bring the gas to the desired temperature before entry into crystallizer 6. Preferably, the gas is heated in heat exchanger 8c.

The circuit system of FIG. 1 further comprises a blocking device 8d (a valve, for example) to conduct a portion of the gas in a secondary circuit.

The circuit system of FIG. 1 further contains a condenser 8e to remove cooling medium from the gas, absorbed by the gas during passage through crystallizer 6. Since, according to the present invention, little cooling medium transitions into crystallizer 6, the dimensions of condenser 8e can be comparatively small.

The apparatus of FIG. 1 has a feed line 11 for fresh process gas, via which process gas can be fed into the above-described circuit system from an inert gas tank (not illustrated) or be let off out of the circuit system.

The present apparatus of the present invention is very useful for continuous pelletization and crystallization of a polymer, especially a polycondensate, preferably a polyester such as polyethylene terephthalate.

The invention claimed is:

1. A device for performing a process for continuous production of partly crystalline polycondensate pellet material, the device comprising
   a unit for forming pellets with a line for supply of a cooling medium and a line for discharge of a mixture of pellets/cooling medium,
   a drying unit, located downstream of the unit for forming pellets, providing a first treatment space,
   and a crystallizer, located downstream of the drying unit, providing a second treatment space and being provided with each an inlet and outlet for the pellets and a gas so that, in the second treatment space, the gas can be led through the pellets under fluidized bed conditions,
wherein the crystallizer is provided at the outlet for the pellets with a first shut off device and a second shut off device, the first shut off device with a housing and a rotor movably arranged therein and having a gap between the rotor and the housing which is larger than the average diameter of the pellets, wherein the average diameter of the pellets is between 0.1 mm and 10 mm, the second shut off device positioned downstream of the first shut off device, the second shut off device having a housing and a rotor movably provided therein, a second gap being defined between the rotor and the housing, the second gap being smaller than the average pellet diameter.

2. The device according to claim 1, wherein the average diameter of the pellets is between 0.5 mm and 3 mm.

* * * * *